Figure 1:
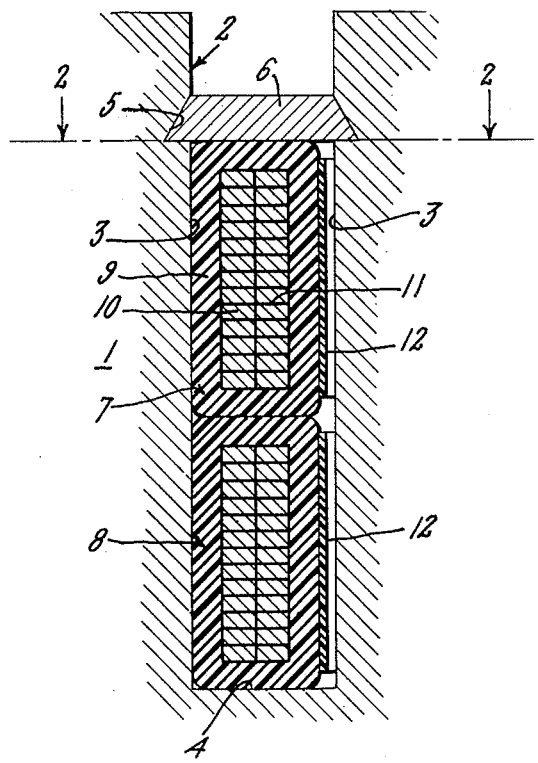

Inventors
Almy D. Coggeshall
Joseph I. Whittlesey
William L. Darby
by W. C. Crutcher
Their Attorney

United States Patent Office 3,158,770
Patented Nov. 24, 1964

3,158,770
ARMATURE BAR VIBRATION DAMPING
ARRANGEMENT
Almy D. Coggeshall and Joseph I. Whittlesey, Schenectady, and William L. Darby, Scotia, N.Y., assignors to General Electric Company, a corporation of New York
Filed Dec. 14, 1960, Ser. No. 75,721
3 Claims. (Cl. 310—214)

This invention relates to an improved arrangement for reducing periodic vibrations exhibited by the armature windings in alternating current dynamoelectric machines, and more particularly it relates to improvements in reducing radial vibration of flat-sided armature bars disposed in radial slots of a stationary armature core.

In large dynamoelectric machines, such as turbine-generators, the stationary armature core is generally made up of punchings which define a cylindrical bore and which also define radial slots opening into the bore. The punchings may also be grouped and the groups spaced longitudinally to allow cooling gas to circulate between the punchings. The heavily insulated armature bars usually generally rectangular in cross section, are disposed in these slots and are electrically connected at the ends of the core to form the armature windings.

There may be one, two, or more such armature bars radially disposed above one another in each slot. These armature bars are generally held in place in the slots by means of longitudinal wedge members which are driven into longitudinal dovetail grooves after the bars are in place. Due to the difficulty in absolutely aligning the punchings and due to the slight variations in thickness of the armature bar insulation, a perfect fit between the bars and the slot in which they are disposed is seldom possible. Also, a small clearance must be left between the bars and the slot walls, in order to insert the armature bars radially into the slots.

As the rotor producing the magnetic field turns in the stator bore, electromagnetic forces are set up which tend to cause the armature bars to vibrate in the slots in a radial direction. This causes wear on the armature bar insulation and the wedges and also leads to added noise in operation. Efforts to apply radial restraint to the bars to reduce the radial vibration have not been entirely satisfactory.

Accordingly, one object of this invention is to provide an improved arrangement for reducing radial vibrations of armature bars of dynamoelectric machines, which are subjected to periodic electrical vibration-inducing forces.

Another object of the invention is to provide increased damping of a vibrating conductor disposed in the slot of a laminated core member.

Still another object is to reduce wear on the insulating sheath and noise caused by vibrating armature bars in a large turbine-generator.

Figure 2:
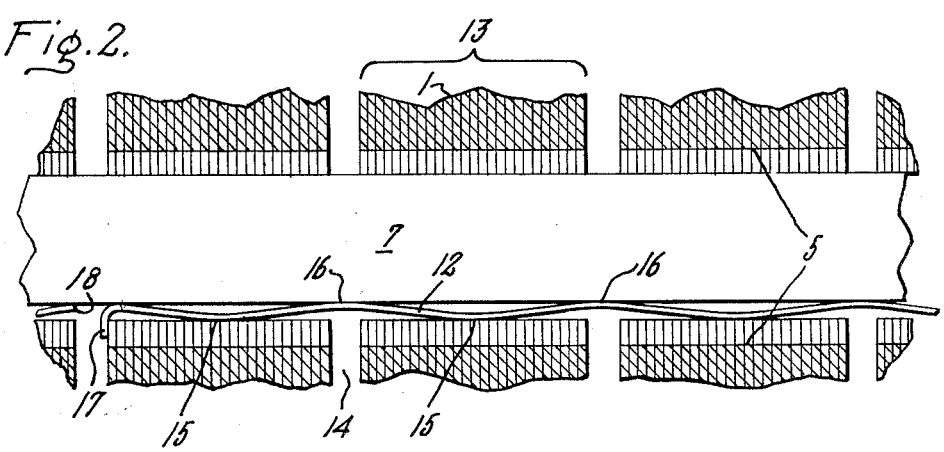

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a cross-sectional view taken through one slot of a dynamoelectric machine armature which uses two radially stacked armature bars; and FIG. 2 is a view taken along lines 2—2 of FIG. 1 looking radially outward at the top of a portion of the armature slot.

Briefly, the invention is practiced by providing sidewise or tranverse biasing pressure between the armature bar and the side of the slot as a means for frictionally damping vibrations of the armature bar in a radial direction in the slot. Various biasing means such as leaf springs can provide the transverse damping force. The preferred embodiment utilizes a "multiple-leaf" spring having a sine wave-like shape or "ripple" along its length, and manufactured from a suitable non-magnetic insulating material.

Reference to FIG. 1 of the drawing shows a transverse cross-sectional view taken parallel to the laminations or punchings, one of which is shown generally at 1. Lamination 1, together with the remaining laminations in the core, defines a radial slot 2 having substantially flat side walls 3 and a bottom 4. Lamination 1 also defines, together with the remaining laminations, a dovetail groove 5 in which is disposed a slot wedge 6. Two armature bars shown generally as 7, 8 are disposed radially on top of one another in slot 2 and held in place by wedge 6. Each armature bar 7, 8 is essentially rectangular in cross section and insulated by heavy ground insulation 9 and the current is carried by stacks of strands 10 which are lightly insulated from one another by "strand insulation" 11. The insulation 9 is preferably a multi-layer type impregnated with thermosetting resin so as to be substantially rigid. An example of a suitable insulation is disclosed in U.S. Patent No. 2,707,204, filed in the names of Charles D. Richardson and Algerd F. Zavist and assigned to the assignee of the present application. In order to provide cooling, strands 10 may be hollow or the bar may include suitable cooling ducts, but the armature bars 7, 8 shown here employ solid copper strands.

The means for applying the transverse damping force is shown in FIG. 1 as "ripple spring" 12, which is better illustrated by reference to FIG. 2 of the drawing. In FIG. 2, wedge 6 has been removed in order that one may look down from the top of the slot on armature bar 7. There it may be seen that the laminations such as 1 are grouped in packages, as indicated by bracket 13, which are longitudinally separated by ventilating ducts 14. The practice of the invention does not require that laminations 1 be grouped exactly as shown, however. The ripple spring 12 is of such a length as to span several such lamination groups 13, although it will later be apparent that springs 12 could be shorter and accomplish the same function. They are here preferably shown long enough to span several lamination groups for ease of assembly.

Ripple spring 12 is approximately the same radial width as the radial dimension of each armature bar. As indicated in FIG. 2, its undulating shape causes it to resiliently press alternately against the side of the slot as indicated by numerals 15 and against the side of bar 7 as indicated by numerals 16. In order to prevent longitudinal shifting of ripple spring 12, one end is formed with a tongue or tab 17 which is struck out from the surface of the spring and extends circumferentially into the air gap spacing 14. The other end of ripple spring 12 need not be formed with a tab such as 17. The end of an adjacent ripple spring is shown at 18.

The material of ripple spring 12 is preferably of a non-magnetic insulating material, and an ideal material for the spring is found to be a glass fiber or glass fabric which is impregnated with a suitable curable plastic, such as a polyester resin. For some applications, non-magnetic stainless steel ripple springs may be satisfactory.

Ripple springs 12 are preferably manufactured by impregnating one or more layers of glass fabric with a curable resin, and causing the resin to cure while holding the fabric in a mold of "ripple" shape. The springs are manufactured with a free transverse dimension greater than that of the space which they will fill, so that the springs must be transversely compressed when inserted so as to exert a substantially constant transverse damping force against the side of the bar.

As an example of a specific application, the clearance between armature bars 7, 8 and the side walls 3 of the slot may be on the order of 40 mils. The spring is manufactured from polyester-glass material with a width on the order of 3¾ inches and a thickness on the order of 35 mils and a "pitch" or distance between "crests" of about 2¼ inches. In its free uncompressed state, the transverse dimension between a projected crest and a trough of the ripple spring might be on the order of 70 mils. When the spring is compressed, it is almost flat and the clearance between the spring and the bar or slot wall is only 40 mils minus the spring thickness of 35 mils, i.e. on the order of 5 mils. The free clearance is exaggerated in FIG. 2 for purposes of explanation.

Such a spring as described will exert a transverse damping force of about 15 pounds per linear inch of armature bar. Once the bar and the spring are in the slot, this force is practically constant, since there is practically no transverse or lateral movement of the bar in the slot, since the tendency of the bar under the electrical excitation forces imposed on it in operation is to move in a radial direction.

The operation and assembly of the ripple spring may be described as follows. After the armature bar is in the slot, the ripple spring is inserted radially with tab 17 aligned with ventilation duct 14 and is driven or wedged radially into place between the bar and the side of the slot.

The action of the ripple spring when the bars 7, 8 tend to vibrate radially is to supply a frictional damping force by pressing the flat-sided bars transversely against the opposite flat slot wall. This frictional force serves to damp radial vibrations and reduce them to a very low figure. For example, a test armature bar damped with a spring such as that described was reduced from 16 mils of radial movement to only ½ mil.

Many suitable equivalents will come to the mind of those skilled in the art. As noted above, the ripple spring 12 could be manufactured in shorter lengths. The pitch of the spring or distance between crests need not be the same as the distance between lamination packages 13 as shown in FIG. 2, but could be multiples of this distance. The undulations or ripples could, instead of extending longitudinally, also extend radially or even diagonally in the slot. The placement of ripple spring 12 is not necessarily limited to one side of the slot but could be on both sides.

Other suitable substitutes might be used to provide transverse biasing pressure between the side of the slot and the armature bar. Due to the necessity for a substantially uniform transverse damping force, absolutely rigid bodies are not very satisfactory, since a slight transverse movement of the bar away from a rigid member would cause the friction force to disappear. However, proper selection of materials or shapes, such as stainless steel leaf springs, to provide a follow-up transverse damping force will naturally occur to those skilled in the art once the basic principle of the invention is understood.

It is therefore intended to cover in the appended claims all such modifications which fall within the true spirit and scope of the invention.

What we claim as new and desire to secure by Letters Patent of the United States is:

1. A vibration-damped conductor bar assembly for an alternating current dynamoelectric machine comprising an armature core defining circumferentially spaced radially directed slots each having a flat-sided slot portion, an armature winding including at least one armature bar having a substantially flat-sided bar portion disposed in each of said slots and subject to electrical forces tending to cause vibratory radial movement of the armature bar in the slot, means retaining the armature bars against radial displacement from said slots, and leaf spring means disposed in each of said slots between one side wall of the slot and an armature bar and exerting a transverse force against the side of the armature bar biasing the flat side portion of the bar into frictional engagement with said flat-sided slot portion to frictionally resist radial vibration of the bar in the slot.

2. A structure for suppressing radial vibration of conductors in an alternating current dynamoelectric machine comprising a laminated armature core defining circumferentially spaced radially directed core slots each having a flat-sided slot portion, an armature winding including at least one substantially flat-sided insulated armature bar disposed in each of said slots, said armature bar being subject to electrical forces tending to cause vibratory radial movement in its slot, means retaining the armature bar against radial displacement from its slot, and a leaf spring of non-magnetic material disposed in said slot between one side wall of the slot and the armature bar, said leaf spring having an undulating shape pressing alternately against the stator laminations and the adjacent side of the bar, whereby the leaf spring exerts a transverse force against the bar to bias it into frictional engagement with said flat-sided slot wall portion to dampen radial vibratory movement of the bar in the slot.

3. A structure for reducing vibration of the conductors in an alternating current dynamoelectric machine comprising a stator core including laminations defining circumferentially spaced radially extending slots each having at least one flat-sided slot wall portion, an armature winding including at least one insulated armature bar with a substantially flat-sided portion disposed in each of said slots, said armature bar being subject to electrical forces tending to induce periodic vibratory radial movement of the bar in its slot, wedge means retaining the bar in its slot, and transverse biasing means disposed between one side of the bar and the adjacent slot wall for exerting a transverse force to bias the flat-sided bar portion against said flat-sided slot wall to frictionally dampen radial vibration of the bar in its slot, said biasing means comprising at least one leaf spring member of a resin-impregnated glass fabric and having an undulatory shape whereby the spring resiliently engages the bar and the slot wall at spaced intervals along the length thereof.

References Cited by the Examiner

UNITED STATES PATENTS

| 1,014,904 | 1/12 | Priest | 310—194 |
| 2,664,512 | 12/53 | Huntley | 310—64 |

FOREIGN PATENTS

| 758,964 | 10/56 | Great Britain. |
| 964,161 | 5/57 | Germany. |

MILTON O. HIRSHFIELD, *Primary Examiner.*